United States Patent [19]

Dunlap et al.

[11] 3,934,836
[45] Jan. 27, 1976

[54] MANDREL ASSEMBLY

[75] Inventors: Danny L. Dunlap; Charles E. Huelsman; John H. Muhlenkamp, all of Minster, Ohio

[73] Assignee: Stamco Division, The Monarch Machine Tool Company, New Bremen, Ohio

[22] Filed: July 31, 1974

[21] Appl. No.: 493,477

[52] U.S. Cl. .............................................. 242/72.1
[51] Int. Cl.² ......................................... B65H 75/18
[58] Field of Search .............................. 242/72, 72.1

[56] References Cited
UNITED STATES PATENTS

| | | | |
|---|---|---|---|
| 2,271,139 | 1/1942 | Holdgate | 242/72.1 |
| 2,598,398 | 5/1952 | Littell | 242/72.1 |
| 3,107,875 | 10/1963 | Gochenour | 242/72.1 |
| 3,244,380 | 4/1966 | Hoyne | 242/72.1 X |

Primary Examiner—Edward J. McCarthy
Attorney, Agent, or Firm—Biebel, French & Bugg

[57] ABSTRACT

A mandrel assembly in which the mandrel segments are expanded and contracted by means of a draw rod extending through the mandrel and driven by the same motor that rotates the mandrel during winding or unwinding operations. The draw rod is fixed for rotation with the mandrel but is movable longitudinally thereof and is provided with power threads on one end which are in engagement with complementary power threads on a nut member carried by the motor shaft. A drive gear is keyed to the nut member so that it is rotatable with the nut member but capable of movement longitudinally thereof into and out of engagement with a driven gear secured to the mandrel. A nonrotatable gear segment is mounted for shifting movement with the drive gear and moves into engagement with the driven gear as the drive gear is disengaged from the driven gear to lock the mandrel against rotation. When the mandrel, and hence the draw rod, are thus locked against rotation, continued rotational movement of the nut member results in longitudinal movement of the draw rod and radial movement of the mandrel segments.

11 Claims, 13 Drawing Figures

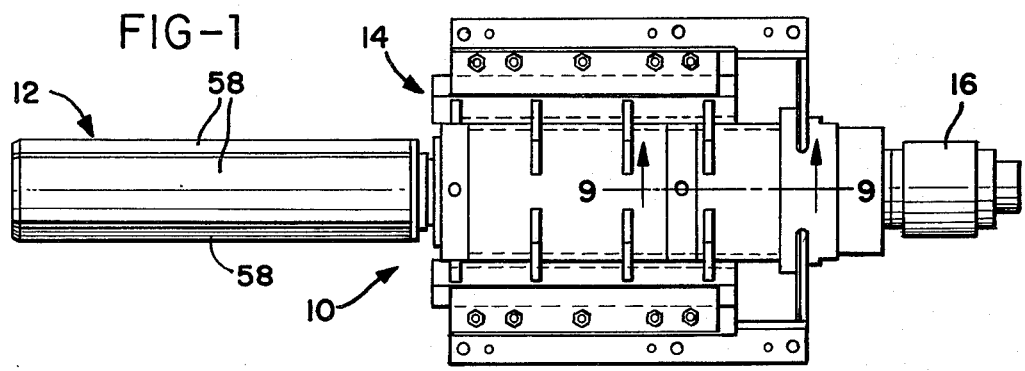
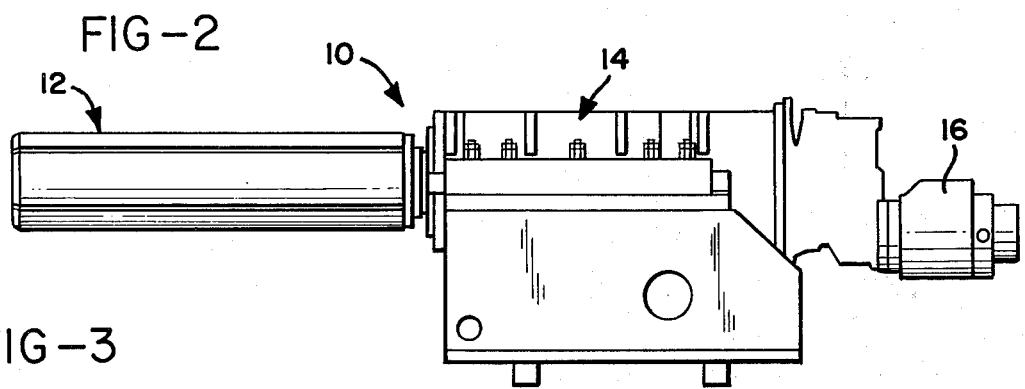
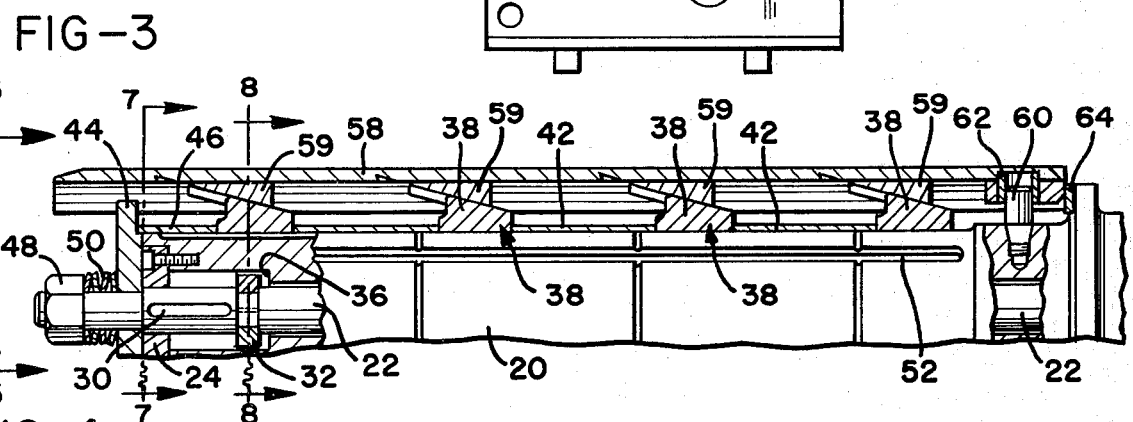
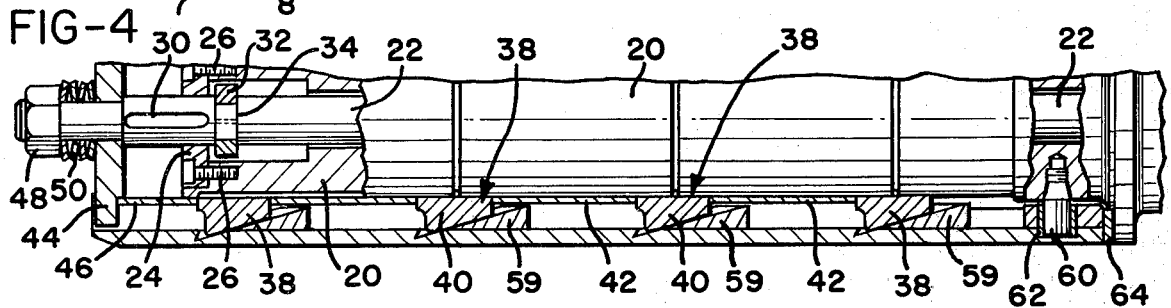
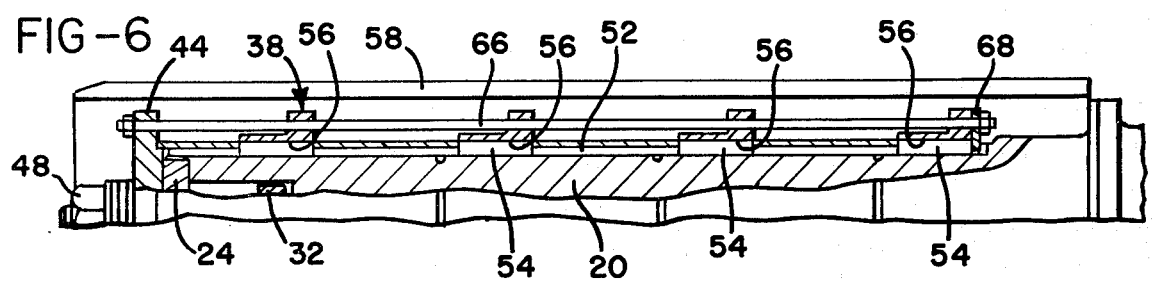

MANDREL ASSEMBLY

BACKGROUND OF THE INVENTION

Many conventional power expanded mandrels utilize a draw rod which, in response to longitudinal movement thereof, causes radial movement of the mandrel segments through interengaging wedges, links or the like. Longitudinal movement of the draw rod is accomplished by means of hydraulic cylinders exerting a direct pull on the draw rod.

With this arrangement it is generally considered impractical to mount the hydraulic cylinders for the draw rods on the free end of the mandrel, since they are prone to damage when positioned in this manner. Therefore, the hydraulic cylinders for the draw rods are generally located adjacent the driven end of the mandrel. Thus, however, requires a hollow shaft thru the drive mechanism and precludes the use of drives which do not have hollow shafts.

It will be seen, therefore, that in prior art, power operated mandrels if a drive without a hollow shaft is desired, the draw rod hydraulic cylinder must be positioned on the free end of the mandrel where it is subject to damage. On the other hand, if the draw rod cylinder is mounted on the motor end of the mandrel shaft, the use of a drive without a hollow shaft is precluded. Additionally, in either case, separate drive means must be provided for the mandrel and the draw rod.

SUMMARY OF THE INVENTION

A mandrel assembly in accordance with the present invention utilizes a single drive, preferably a hydraulic motor, for both expanding and collapsing the mandrel and driving it. The mandrel itself includes a plurality of mandrel seqments surrounding a hollow mandrel shaft within which is received a draw rod mounted for movement longitudinally thereof. The draw rod and the mandrel segments are interconnected by means of wedges, links or the like so that upon longitudinal movement of the draw rod the segments move inwardly and outwardly with respect to the mandrel shaft to cause contraction and expansion of the mandrel.

A splined shaft from the drive is received within a nut member having internal power threads, and the nut member is keyed to a drive transmitting sub-assembly which is, therefore, fixed for rotation with the nut member and the drive shaft, but capable of slidable movement axially of the shaft. The sub-assembly includes an internally toothed drive gear which is engageable with external teeth on a drive gear fixed to the end of the mandrel shaft. By virtue of the slidable connection between the sub-assembly and the nut member, the drive gear can be engaged and disengaged with the driven gear on the mandrel shaft.

Also mounted for sliding movement contemporaneously with the drive gear is a nonrotatable gear segment which moves into engagement with a portion of the driven gear upon disengagement of the drive gear from the driven gear. Therefore, when the drive gear is disengaged the mandrel shaft is locked against further rotation. The draw rod, while capable of longitudinal movement with respect to the mandrel shaft, is fixed for rotation with the mandrel shaft, so that when the mandrel shaft is locked against rotation the draw rod is also prevented from rotating.

However, the nut member mounted on the drive shaft has its threads in engagement with complementary power threads on the end of the draw rod. Therefore, continued rotation of the nut member will result in longitudinal movement of the draw rod and resultant radial movement of the mandrel segments to thereby expand or contract the mandrel as desired.

It will be seen, therefore, that the assembly of the present invention eliminates the necessity of utilizing a hollow shaft through the drive mechanism and the positioning of an actuating cylinder on the free end of the mandrel assembly and utilizes the same drive for both rotating the mandrel and causing expansion and contraction thereof.

BRIEF DESCRIPTION OF THE DRAWINGS

FIG. 1 is a plan view of a mandrel assembly in accordance with the present invention;

FIG. 2 is an elevational view thereof;

FIG. 3 is a view, partly in section, of a portion of a mandrel in the contracted configuration;

FIG. 4 is a view similar to FIG. 3, but with the mandrel in the expanded configuration;

FIG. 6 (sheet 1) is a cross-sectional view taken on line 6—6 of FIG. 5;

DESCRIPTION OF THE PREFERRED EMBODIMENT

A mandrel assembly 10 in accordance with the present invention includes, as best seen in FIGS. 1 and 2 of the drawings, a mandrel 12, a housing 14 and drive means 16. The drive means may include a conventional hydraulic motor, although it will be apparent as the description proceeds that other types of motors may also be used in accordance with the present invention.

Similarly, the mandrel 12 can take a variety of specific configurations, as long as it is of the general type which includes a draw rod, which through the use of wedges, links or the like, cause a radial expansion and contraction of the mandrel segments in response to longitudinal movement of the draw rod. For purposes of illustration, the mandrel may take the configuration shown in FIGS. 3 through 7 of the drawings.

Figure 5:
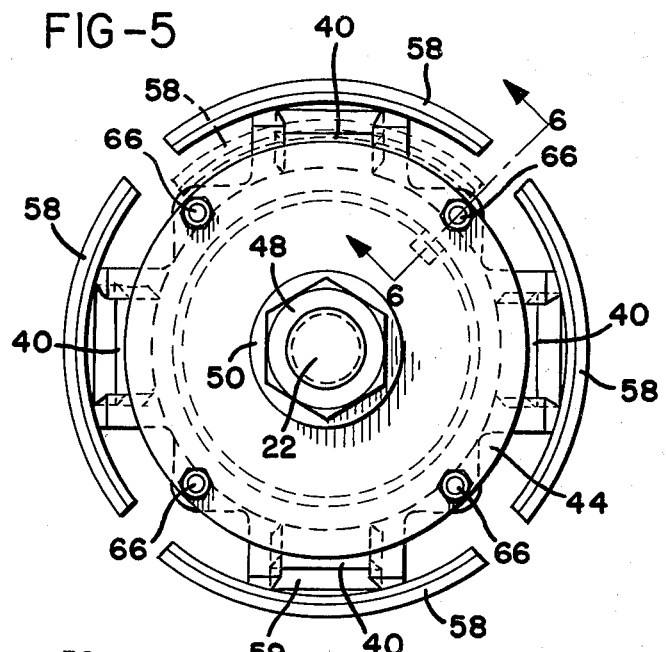
FIG. 5 (sheet 2) is a view taken on line 5—5 of FIG. 3.
Figure 7:
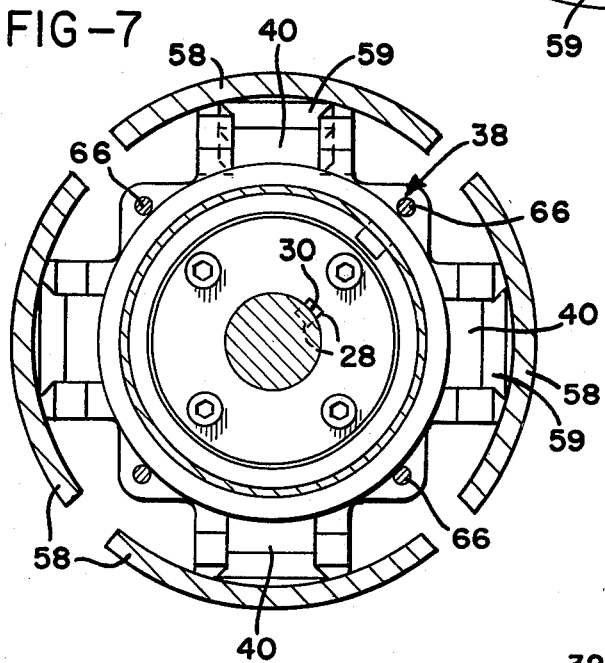
FIG. 7 (sheet 2) is a cross-sectional view taken on line 7—7 of FIG. 3.

Thus, the mandrel includes a mandrel shaft 20 of hollow configuration receiving a draw rod 22 extending longitudinally thereof. A stop plate 24 may be bolted, as at 26, to the end of the shaft 20 and, as best seen in FIG. 7, the stop plate is provided with a keyway 28 receiving a key 30 projecting outwardly from the surface of the draw rod 22 and locking the draw rod for rotational movement with the shaft 20 while allowing relative longitudinal movement of the draw rod within the hollow mandrel shaft.

A split collar 32 is received in an annular groove 34 in the draw rod and serves as a stop to limit longitudinal movement of the draw rod with respect to the mandrel shaft by engagement with the shoulder 36 formed in the shaft and the stop plate 24.

A series of wedge rings 38, each carrying four wedges 40, encircle the shaft 20 and are held in spaced relationship to each other by means of cylindrical spacers 42 and in spaced relationship to an end plate 44 attached to the end of the draw rod 22 by a cylindrical spacer 46.

The end plate 44 is attached to the end of the draw rod by means of a nut 48 threaded on the end of the draw rod with a series of bevelled washers 50 interposed between the under surface of the nut and the outer surface of the end plate.

Figure 8:
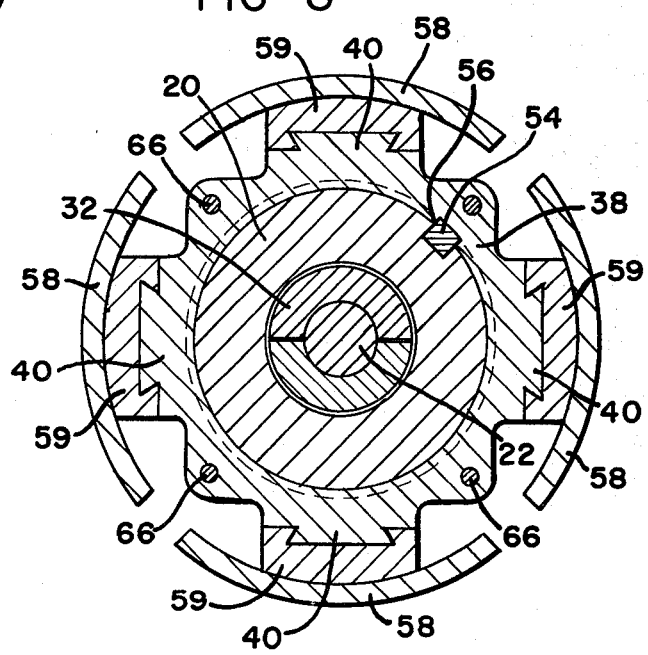
FIG. 8 is a cross-sectional view taken on line 8—8 of FIG. 3.

A keyway 52 is formed in and extends longitudinally of the mandrel shaft 20 and, as best seen in FIGS. 6 and 8 of the drawings, receives a series of keys 54 which also are received in keyways 56 in the wedge rings.

The mandrel includes a plurality of mandrel segments 58, four of which are shown for purposes of illustration, and each mandrel segment is provided with a series of regularly spaced wedges 59 which cooperate with the wedges 40 on the wedge rings 38.

Guide studs 60 are threaded into the mandrel shaft and are slidably received in bushings 62 secured in each of the mandrel segments. Additionally, a wear plate 64 is mounted adjacent the rear of the mandrel and absorbs thrust of the mandrel segments during expansion of the mandrel.

The assembly of wedge rings, spacers and keys 54 are held in place by means of tie rods 66 which extend through the end plate 44 and each of the wedge rings and are provided with nuts at opposite ends to draw the wedge rings and spacers together. Additionally, a keeper plate 68 is mounted adjacent to the right hand wedge ring, as seen in FIG. 3, to retain the right hand key 54 in place.

From the above description, it will be apparent that the draw rod is keyed to the mandrel shaft for rotational movement therewith but is capable of longitudinal movement within the shaft. At the same time, the wedge rings 38 are keyed to the mandrel shaft for rotation therewith but are movable longitudinally thereof in unison with the draw rod 22 to which they are attached by means of the end plate 44 and the tie rods 66.

The mandrel segments 58 are fixed for rotation with the mandrel shaft and draw rod by virtue of the interlocking dove tail configuration of the wedges 40 and 59 and through the guide studs 60. With this construction, it will be apparent that upon longitudinal movement of the draw rod within the mandrel shaft 20 the mandrel segments 58 will move radially inwardly and outwardly with respect to the longitudinal axis of the mandrel.

As noted previously, any mandrel which is operated by means of longitudinal movement of a draw rod to cause radial movement of the mandrel segments may be utilized in accordance with the present invention and the above description is merely for purposes of illustration of a particular type of mandrel that may be used with the present invention.

Figure 9:
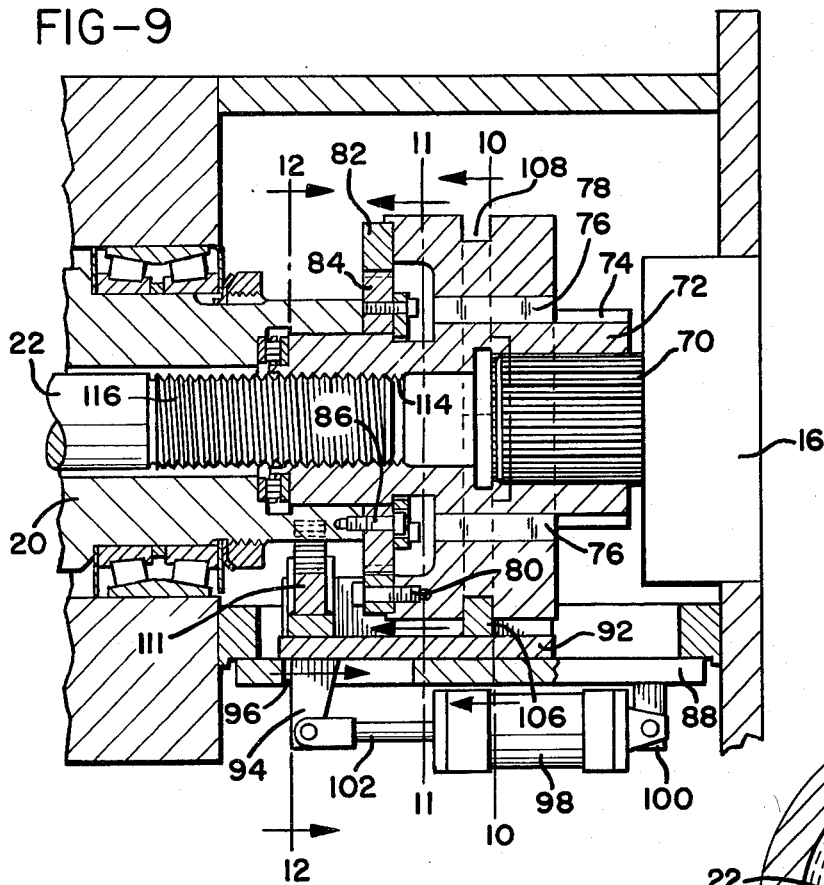
FIG. 9 is a cross-sectional view taken on line 9—9 of FIG. 1.

Turning now to FIGS. 1, 2 and 8 through 11 of the drawings, the mechanism for causing longitudinal movement of the draw rod will be described. As seen in FIG. 9 of the drawings, a splined drive shaft 70 of the drive means 16 is received in a complementarily configured socket in a nut member 72.

The nut member is provided with opposed external keyways 74 receiving keys 76 which are also received in keyways in a collar 78. The collar 78 is thus capable of sliding movement relative to the nut member 72 and the motor shaft 70 but is locked for rotational with the shaft 70 and member 72.

Fixed to the collar 78 by means of bolts 80 or the like is an internally toothed drive gear 82, and a complementary, externally toothed driven gear 84 is bolted to an end of the mandrel shaft 20 by means of bolts or the like 86. Thus, upon rotation of the motor shaft 70, drive is transmitted to the mandrel shaft when the collar 78 and drive gear 82 are in the positions shown in FIG. 9 of the drawings.

A supporting plate 88 is mounted in the housing 14 and supports a shifter plate 92 for sliding movement thereon. A depending leg 94 projects from the lower surface of the plate 92 through a slot 96 in the plate 88. A hydraulic cylinder 98 is attached to a bracket 100 and a piston rod 102 projects from the cylinder 98 and is attached to the leg 94. Therefore, upon extension and retraction of the piston rod 102 the plate 92 slides back and forth across the surface of the plate 88.

Figure 10:
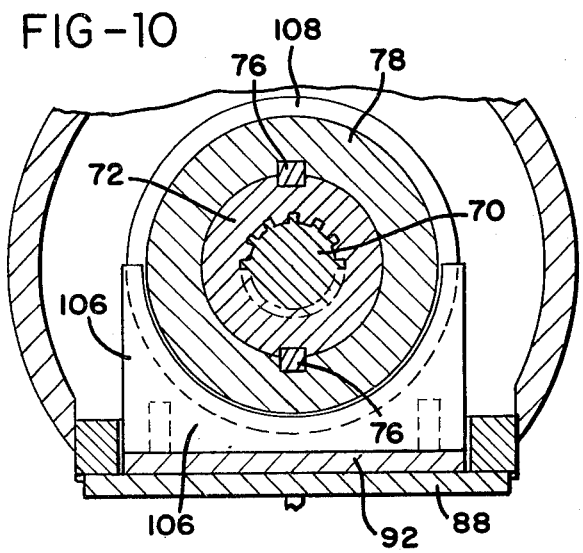
FIG. 10 is a cross-sectional view taken on line 10—10 of FIG. 9.
Figure 11:
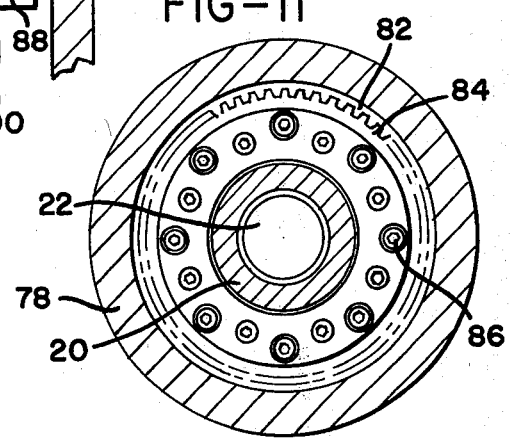
FIG. 11 is a cross-sectional view taken on line 11—11 of FIG. 9.
Figure 12:
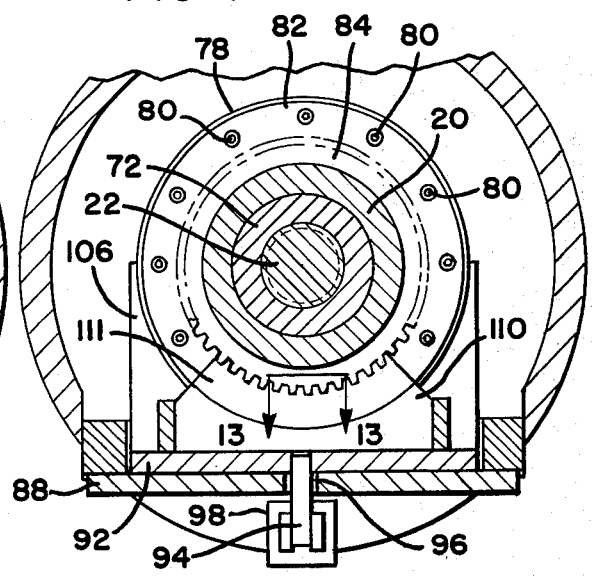
FIG. 12 is a cross-sectional view taken on line 12—12 of FIG. 9.

As best seen in FIGS. 9, 10 and 12 of the drawings, the plate 92 carries an upstanding plate 106 which has a semi-circular upper edge received in an annular groove 108 formed in the collar 78. Thus, shifting movement of the plate 92 is transmitted by the plate 106 to the collar 78.

Plate 92 also carries a second upstanding plate 110 having attached thereto by welding or the like a gear segment 111 having upwardly projecting gear teeth 112 complementary to the teeth of the driven gear 84.

Figure 13:
FIG. 13 is a cross-sectional view taken on line 13—13 of FIG. 12.

It will be apparent, therefore, that as the plate shifts to the right, as seen in FIG. 9 of the drawings, the drive gear 82 will be disengaged from the driven gear and the teeth 112 of the gear segment will engage the teeth of the driven gear 84 and prevent further rotation of the mandrel shaft 20. To facilitate engagement of the teeth 112 of the gear segment with the teeth of the driven gear 84, the gear segment teeth be bevelled at the lead ends thereof as seen at 113 in FIG. 13 of the drawings. Additionally, the teeth of gear 84 may be bevelled at both ends and the teeth of gear 82 bevelled at their left hand end, as viewed in FIG. 9, all to facilitate engagement of the gears with each other.

Although disengagement of the drive gear from and engagement of the gear segment with the driven gear will lock the mandrel shaft against rotation, the motor shaft 70 and nut member 72 are still free to rotate. The nut member is provided with internal power threads 114 which are in engagement with external power threads 116 on the right hand end of the draw rod 22.

Since the draw rod is keyed to the mandrel shaft and cannot rotate when the mandrel shaft is locked against rotation by the gear segment 112, continued rotation of the motor shaft 70 and nut member 72 will cause the draw rod to be threaded or unthreaded from the nut member 72 depending upon the direction of rotation of the nut member 72.

In either case, the result will be longitudinal movement of the draw rod 22 within the hollow mandrel shaft and, through the wedges 40 and 59 or other actuating means such as links or the like, radial movement of the mandrel segments 58 between expanded and collapsed positions thereof.

From the above, it will be seen that a mandrel assembly in accordance with the present invention permits the mandrel to be driven directly by drive means which serves to both drive the mandrel and cause expansion and contraction thereof.

While the form of apparatus herein described constitutes a preferred embodiment of the invention, it is to be understood that the invention is not limited to this precise form of apparatus, and that changes may be made therein without departing from the scope of the invention.

What is claimed is:

1. In a rotatable and expandable mandrel assembly including a mandrel including a plurality of longitudinally extending mandrel segments, a draw rod disposed within said mandrel, extending longitudinally thereof and fixed for rotation with said mandrel while movable longitudinally thereof, means for causing relative radial movement of said segments between expanded and collapsed mandrel configurations in response to longitudinal movement of said draw rod, and drive means mounted adjacent one end of said mandrel, the improvement comprising:
   a. means for transmitting drive from said drive means to said mandrel to cause rotation thereof,
   b. actuating means for causing longitudinal movement of said draw rod, and
   c. means for selectively coupling said drive means to said drive transmitting means for rotation of said mandrel or to said actuating means to shift said draw rod longitudinally thereof and cause said segments to be shifted radially with respect to the longitudinal axis of said mandrel.

2. The assembly of claim 1 wherein said actuating means comprises:
   a. means defining power threads on said draw rod adjacent said motor, and
   b. a threaded member carrying power threads complementary to and in engagement with said draw rod power threads and driven by said drive means in rotational movement about a longitudinal axis of said draw rod.

3. The assembly of claim 2 wherein the selective coupling means includes:
   a. means for locking said mandrel and said draw rod against rotational movement about said longitudinal axis thereof while permitting said threaded member to be driven in rotational movement by said drive means.

4. The assembly of claim 3 wherein:
   a. said transmitting means comprises a drive gear rotated by said drive means and a driven gear fixed to said mandrel, and
   b. the selective coupling means comprises means for shifting said drive gear from engagement with said driven gear.

5. The assembly of claim 4 wherein:
   a. said locking means comprises nonrotatable gear means engageable with said driven gear upon said shifting movement of said drive gear.

6. The assembly of claim 4 wherein:
   a. said threaded member is fixed for rotation with a drive shaft of said drive means, and
   b. said driven gear is keyed to said threaded member for rotational movement therewith and relative longitudinal movement with respect thereto.

7. The assembly of claim 2 wherein:
   a. said complementary power threads include external threads on said draw rod and internal threads on said threaded member.

8. The assembly of claim 5 wherein:
   a. gear teeth on said driven gear are bevelled in directions facing said drive gear and said nonrotatable gear to facilitate engagement with teeth thereof.

9. The assembly of claim 4 wherein:
   a. said mandrel includes a hollow mandrel shaft, and
   b. said driven gear is mounted on said mandrel shaft.

10. The assembly of claim 9 wherein:
    a. said draw rod is received within said hollow mandrel shaft.

11. The assembly of claim 1 wherein:
    a. said mandrel further comprises a hollow mandrel shaft extending longitudinally of said mandrel,
    b. said mandrel segments are keyed to said shaft for said radial movement thereof, and
    c. said draw rod is received within said hollow mandrel shaft.

* * * * *